United States Patent
Futae et al.

(10) Patent No.: US 10,330,152 B2
(45) Date of Patent: Jun. 25, 2019

(54) FLOATING BUSH BEARING DEVICE AND TURBOCHARGER PROVIDED WITH THE BEARING DEVICE

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Tadasuke Nishioka, Tokyo (JP); Takashi Nambu, Tokyo (JP); Noriyuki Hayashi, Tokyo (JP); Hiroshi Suzuki, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 368 days.

(21) Appl. No.: 15/114,156

(22) PCT Filed: Feb. 27, 2014

(86) PCT No.: PCT/JP2014/054802
§ 371 (c)(1),
(2) Date: Jul. 26, 2016

(87) PCT Pub. No.: WO2015/128978
PCT Pub. Date: Sep. 3, 2015

(65) Prior Publication Data
US 2017/0009810 A1    Jan. 12, 2017

(51) Int. Cl.
*F16C 33/10*    (2006.01)
*F02B 39/14*    (2006.01)
(Continued)

(52) U.S. Cl.
CPC ........ *F16C 33/1045* (2013.01); *F01D 25/166* (2013.01); *F02B 33/40* (2013.01);
(Continued)

(58) Field of Classification Search
None
See application file for complete search history.

(56) References Cited

U.S. PATENT DOCUMENTS 4,358,253 A * 11/1982 Okano ............ F01D 25/166
384/368
4,834,559 A    5/1989 Kalvoda
(Continued)

FOREIGN PATENT DOCUMENTS

| CN | 102733932 A | 10/2012 |
| CN | 103261624 A | 10/2012 |

(Continued)

OTHER PUBLICATIONS

JP2002332864_Machine_Translation; Generated by espacenet.com; Oct. 2018.*
(Continued)

*Primary Examiner* — Eldon T Brockman
(74) *Attorney, Agent, or Firm* — Birch, Stewart, Kolasch & Birch, LLP (57) ABSTRACT

An object is to provide a floating bush bearing device including a circumferential groove over the entire circumference of an outer peripheral surface of a floating bush while ensuring that a pressing force is applied by lubricant oil to the floating bush to reduce oscillation, as well as a turbocharger provided with the bearing device. A floating bush bearing device includes: a rotary shaft disposed rotatably inside a bearing hole of a casing; a floating bush surrounding the rotary shaft; an oil-feed hole of lubricant oil having an opening on an inner peripheral surface of the bearing hole; a plurality of communication holes formed on the floating bush, each extending between an inner peripheral surface and an outer peripheral surface of the floating bush, and disposed at intervals in a circumferential direction of the floating bush; and a circumferential groove formed on
(Continued)

the outer peripheral surface of the floating bush or the inner peripheral surface of the bearing hole and extending over an entire circumference of the outer peripheral surface of the floating bush or the inner peripheral surface of the bearing hole, the circumferential groove passing through openings of the plurality of communication holes or facing the openings of the plurality of communication holes. The circumferential groove has a cross-sectional area which varies in accordance with a circumferential position.

15 Claims, 8 Drawing Sheets

(51) Int. Cl.
    *F16C 17/18*     (2006.01)
    *F01D 25/16*     (2006.01)
    *F02B 33/40*     (2006.01)
    *F02B 37/00*     (2006.01)
    *F16C 17/02*     (2006.01)

(52) U.S. Cl.
    CPC .............. *F02B 37/00* (2013.01); *F02B 39/14* (2013.01); *F16C 17/02* (2013.01); *F16C 17/18* (2013.01); *F16C 33/106* (2013.01); *F16C 33/1065* (2013.01); *F16C 33/1075* (2013.01); *F16C 33/1085* (2013.01); *F05D 2220/40* (2013.01); *F05D 2240/30* (2013.01); *F05D 2240/50* (2013.01); *F05D 2260/98* (2013.01); *F16C 2360/24* (2013.01); *Y02T 10/144* (2013.01)

(56) References Cited

U.S. PATENT DOCUMENTS

| | | | |
|---|---|---|---|
| 9,587,515 B2 * | 3/2017 | Nishida | F02M 55/00 |
| 9,726,189 B2 * | 8/2017 | Nishida | F16C 17/18 |
| 2002/0061146 A1 | 5/2002 | Ono et al. | |
| 2012/0263589 A1 | 10/2012 | Iwata et al. | |
| 2013/0108483 A1 | 5/2013 | Becker et al. | |
| 2014/0010647 A1 * | 1/2014 | Nishida | F16C 17/18 415/229 |
| 2014/0112776 A1 | 4/2014 | Kamata | |
| 2014/0119898 A1 * | 5/2014 | Nishida | F02M 55/00 415/170.1 |

FOREIGN PATENT DOCUMENTS

| | | | |
|---|---|---|---|
| CN | 102859122 A | 1/2013 | |
| EP | 2 302 176 A2 | 3/2011 | |
| EP | 2 693 017 A1 | 2/2014 | |
| EP | 2 937 582 A1 | 10/2015 | |
| JP | 56-143316 A | 11/1981 | |
| JP | 58-142014 A | 8/1983 | |
| JP | 61-201917 A | 9/1986 | |
| JP | 6-78489 A | 3/1994 | |
| JP | 8-219148 A | 8/1996 | |
| JP | 2002-213450 A | 7/2002 | |
| JP | 2002-332864 A | 11/2002 | |
| JP | 3392566 B2 | 3/2003 | |
| JP | 2011-153668 A | 8/2011 | |
| JP | 2011-236966 A | 11/2011 | |
| JP | 4969531 B2 * | 7/2012 | .............. F16C 17/18 |
| JP | 2012-207584 A | 10/2012 | |
| JP | 5337227 B2 | 11/2013 | |
| WO | WO 2013/002141 A1 | 1/2013 | |

OTHER PUBLICATIONS

Office Action effective Oct. 20, 2017 issued to the corresponding Chinese Application No. 201480074222.6 with an English Translation.
Extended European Search Report effective Jan. 16, 2017 issued in the corresponding EP Application No. 14884074.7.
Extended European Search Report effective Mar. 8, 2018 issued to the corresponding European Application No. 17201107.4.
First Office Action effective Mar. 6, 2018 issued to the corresponding European Application No. 14884074.7.
International Preliminary Report on Patentability and Written Opinion of the International Searching Authority (Forms PCT/IB/326, PCT/IB/338, PCT/IB/373 and PCT/ISA/237) dated Sep. 9, 2016, for International Application No. PCT/JP2014/054802 with the Englis translation.
International Searh Report (Forms PCT/ISA/210 and PCT/ISA/220) dated May 27, 2014, for International Application No. PCT/JP2014/054802.

* cited by examiner

CIRCUMFERENTIAL POSITION

FLOATING BUSH BEARING DEVICE AND TURBOCHARGER PROVIDED WITH THE BEARING DEVICE

TECHNICAL FIELD

The present disclosure relates to a floating bush bearing device and a turbocharger provided with the bearing device.

BACKGROUND ART

For instance, a turbocharger for an automobile includes a turbine and a compressor, and a turbine rotor of the turbine and an impeller of the compressor are coupled to each other via a rotor shaft. The rotor shaft is supported rotatably by a radial bearing, which supports loads in the radial direction.

For instance, Patent Document 1 discloses a radial bearing which is a floating bush bearing, and a floating bush bearing includes a floating bush fitted onto a rotor shaft via a gap. The floating bush is disposed in a bearing hole, and an oil path (oil-feed hole) has an opening on an inner peripheral surface of the bearing hole.

The floating bush includes a plurality of lubricant-oil communication holes penetrating through the floating bush diagonally with respect to the radial direction, and lubricant oil supplied in the bearing hole through the oil-feed hole flows inside the floating bush through the lubricant-oil communication holes of the floating bush. The central region of an outer peripheral surface of the floating bush having openings of the lubricant-oil communication holes is formed to have a concave surface, and the concave surface forms a circumferential groove of a constant width over the entire circumference of the outer peripheral surface of the floating bush.

CITATION LIST

Patent Literature

Patent Document 1: JP5337227B

SUMMARY

Problems to be Solved

In the floating bush bearing disclosed in Patent Document 1, a circumferential groove is disposed over the entire circumference of the outer peripheral surface of the floating bush, which provides an effect to supply lubricant oil smoothly to each lubricant-oil communication hole.

Meanwhile, in a floating bush bearing, lubricant oil is supplied to the floating bush through an oil-feed hole which opens into the inner peripheral surface of the bearing hole, and thereby a static-pressure distribution of the lubricant oil is created in the circumferential direction of the floating bush. Due to the static-pressure distribution of the lubricant oil, the floating bush and the rotor shaft are pressed in one direction toward the inner peripheral surface of the bearing hole in the radial direction, and unstable oscillation of the rotor shaft is suppressed.

In this regard, if a circumferential groove is provided over the entire circumference of the outer peripheral surface of the floating bush, lubricant oil supplied through the oil-feed hole is dispersed through the circumferential groove, which reduces a difference in the static-pressure distribution of the lubricant oil in the circumferential direction, and weakens the pressing force.

Thus, an object of at least one embodiment of the present invention is to provide a floating bush bearing device including a circumferential groove over the entire circumferential direction of an outer peripheral surface of a floating bush while ensuring that a pressing force is applied by lubricant oil to the floating bush to suppress oscillation, as well as a turbocharger provided with the bearing device.

Solution to the Problems

A floating bush bearing device according to at least one embodiment of the present invention comprises: a casing including a bearing hole; a rotary shaft disposed rotatably inside the bearing hole; a floating bush disposed rotatably inside the bearing hole and surrounding the rotary shaft; an oil-feed hole of lubricant oil, the oil-feed hole having an opening on an inner peripheral surface of the bearing hole; a plurality of communication holes formed on the floating bush, each of the communication holes extending between an inner peripheral surface and an outer peripheral surface of the floating bush, and disposed at intervals in a circumferential direction of the floating bush; and a circumferential groove formed on the outer peripheral surface of the floating bush or the inner peripheral surface of the bearing hole and extending over an entire circumference of the outer peripheral surface of the floating bush or the inner peripheral surface of the bearing hole, the circumferential groove passing through openings of the plurality of communication holes or facing the openings of the plurality of communication holes. The circumferential groove has a cross-sectional area which varies in accordance with a circumferential position.

With this configuration, the cross-sectional area of the circumferential groove is varied in accordance with the circumferential position, and the cross-sectional area is relatively smaller at one or more location. With the one or more location having a relatively small cross-sectional area, a flow of lubricant oil inside the circumferential groove is mitigated, and a pressure decrease of lubricant oil in the vicinity of the opening of the oil-feed hole is suppressed. As a result, it is possible to press the floating bush in one direction with the lubricant oil supplied through the oil-feed hole.

On the other hand, with this configuration, while the cross-sectional area is relatively small in some locations, the cross-sectional area is relatively large in other locations. Lubricant oil is temporarily stored in the locations with a larger cross-sectional area, and thereby it is possible to supply a sufficient amount of lubricant oil into the floating bush through the communication holes regardless of the presence of the locations with a smaller cross-sectional area.

In some embodiments, the circumferential groove is formed on the outer peripheral surface of the floating bush. The circumferential groove includes a plurality of first regions in which the circumferential groove positionally overlaps with the respective openings of the plurality of communication holes in the circumferential direction of the floating bush, and a plurality of second regions each extending between the plurality of first regions. A cross-sectional area of each of the plurality of first regions is greater than a cross-sectional area of each of the plurality of second regions.

With this configuration, the first regions positionally overlapping with the openings of the communication holes have a larger cross section than the second regions extending between the first regions, which makes it possible to store a relatively large amount of lubricant oil in the first regions.

Specifically, it is possible to store a sufficient amount of lubricant oil in the vicinity of the communication holes. As a result, it is possible to supply a sufficient amount of lubricant oil into the floating bush through the communication holes.

In some embodiments, the circumferential groove is formed on the inner peripheral surface of the bearing hole. The circumferential groove includes a plurality of first regions disposed corresponding to the intervals of the plurality of communication holes in the circumferential direction of the bearing hole, and a plurality of second regions each extending between the plurality of first regions. A cross-sectional area of each of the plurality of first regions is greater than a cross-sectional area of each of the plurality of second regions.

With this configuration, the first regions disposed in accordance with the intervals in the circumferential direction of the communication holes have a larger cross section than the second regions extending between the first regions, which makes it possible to store a relatively large amount of lubricant oil in the first regions. Specifically, it is possible to store a sufficient amount of lubricant oil in the vicinity of the communication holes. As a result, it is possible to supply a sufficient amount of lubricant oil into the floating bush through the communication holes.

In some embodiments, a width of each of the plurality of first regions is greater than a width of each of the plurality of second regions.

With this configuration, the first regions have a larger width than the second regions, and thereby it is possible to readily increase the cross-sectional area of the first regions as compared to the second regions.

In some embodiments, the width of each of the plurality of first regions is in a range of from 0.9 to 1.3 times a width of each of the plurality of communication holes. At least one of the plurality of first regions includes a part at which a width of the circumferential groove reaches a maximum width. The width of each of the plurality of second regions is in a range of from 0.2 to 0.4 times the maximum width of the circumferential groove.

With this configuration, the width of the first regions is in a range of from 0.9 to 1.3 as large as the width of each of the communication holes, and thereby a sufficient amount of lubricant oil can be stored in the first regions.

Furthermore, the width of the second regions is from 0.2 to 0.4 times as large as the maximum width of the circumferential groove, and thereby it is possible to securely restrict a flow of lubricant oil in the circumferential direction in the second regions.

In some embodiments, the plurality of first regions is each formed by corresponding one of a plurality of recess portions, and an opening of each of the plurality of recess portions has one of a circular shape, an oval shape, or a rectangular shape.

With this configuration, the opening of each of the first regions has a circular, oval, or rectangular shape, and thereby it is possible to form the first regions readily.

In some embodiments, a cross-sectional area of a part of the circumferential groove is substantially equal to a cross-sectional area of the other part disposed 180° opposite from the part.

With this configuration, it is possible to prevent the weight of the floating bush from losing balance due to formation of the circumferential groove with a width that varies in accordance with the circumferential position, and to prevent oscillation due to formation of the circumferential groove.

In some embodiments, a depth of each of the plurality of first regions is greater than a depth of each of the plurality of second regions.

With this configuration, the depth of the first regions is greater than the depth of the second regions, and thereby it is possible to readily increase the cross-sectional area of the first regions as compared to the second regions.

Moreover, with this configuration, the depth of the first regions is relatively greater than that of the second regions, and thereby it is possible to induce a flow of lubricant oil flowing toward the communication holes, and to supply lubricant oil into the floating bush more effectively.

In some embodiments, the width of the circumferential groove is substantially constant. A maximum depth of the circumferential groove is not more than 50 times a radial gap between the outer peripheral surface of the floating bush and the inner peripheral surface of the bearing hole. A minimum depth of the circumferential groove is in a range of from two to three times the radial gap.

With this configuration, the maximum depth of the circumferential groove is set to not more than 50 times the radial gap, and the minimum depth of the circumferential groove is set in a range of from two to three times the radial gap, and thereby it is possible to induce a flow of lubricant oil flowing toward the communication holes, and to supply lubricant oil into the floating bush more effectively.

In some embodiments, a cross-sectional area of a downstream region of the circumferential groove joined to a downstream side of the communication hole in a rotational direction of the floating bush increases toward the communication hole in the circumferential direction of the floating bush.

With this configuration, the cross-sectional area of the downstream region increases toward the communication hole, and if lubricant oil is supplied through the oil-feed hole while the floating bush is stopped, the lubricant oil flows into the communication hole from the downstream region, and thereby applies a rotational force to the floating bush. Accordingly, if lubricant oil is supplied at the beginning of rotation of the rotary shaft, it is possible to assist the start of rotation of the floating bush with a rotational force applied by the lubricant oil.

In some embodiments, a bottom surface of the downstream region joined to the communication hole is formed by an inclined surface inclined from the outer peripheral surface, and the inclined surface is inclined so that the depth of the circumferential groove increases toward the communication hole in the circumferential direction of the floating bush.

With this configuration, the bottom surface of the downstream region joined to the communication hole is formed by the inclined surface, and thereby it is possible to increase the cross-sectional area of the downstream region toward the communication hole readily.

In some embodiments, the inner peripheral surface of the floating bush has a Reuleaux polygonal shape in a cross section orthogonal to an axis of the floating bush.

If the inner peripheral surface of the floating bush has a Reuleaux polygonal shape, it is possible to enhance oscillation stability and to reduce bearing loss as compared to a case in which the inner peripheral surface of the floating bush has a true circular cross section.

On the other hand, if the inner peripheral surface of the floating bush has a Reuleaux polygonal shape, there is a larger gap between the inner peripheral surface of the floating bush and the outer peripheral surface of the rotary shaft as compared to a case in which the inner peripheral surface of the floating bush has a true circular cross section. Thus, a greater amount of lubricant oil needs to be supplied to the gap between the inner peripheral surface of the floating bush and the outer peripheral surface of the rotary shaft. In this regard, with the circumferential groove with a cross-sectional area varying in accordance with the circumferential position formed on the outer peripheral surface of the floating bush, it is possible to supply a sufficient amount of lubricant oil to a gap between the inner peripheral surface of the floating bush and the outer peripheral surface of the rotary shaft through the communication holes.

A turbocharger according to at least one embodiment of the present invention comprises: the floating bush bearing device having any one of the above configurations; a centrifugal compressor including an impeller; and a turbine including a turbine blade. The turbine blade and the impeller are coupled to each other via the rotary shaft.

With this configuration, oscillation of the floating bush bearing device is mitigated, and thus the turbocharger has a good noise-reduction property.

Advantageous Effects

According to at least one embodiment of the present invention, provided is a floating bush bearing device including a circumferential groove over the entire circumference of an outer peripheral surface of the floating bush while ensuring that a pressing force is applied by lubricant oil to the floating bush to reduce oscillation, as well as a turbocharger provided with the bearing device.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention. For instance, an expression stating that something is along a direction includes not only being strictly parallel to the direction but also being inclined from the direction with tolerance or a certain angular degree, where needed. Further, an expression "substantially" means that description may include an error within a range of tolerance or modification that is normally performed.

Figure 1:
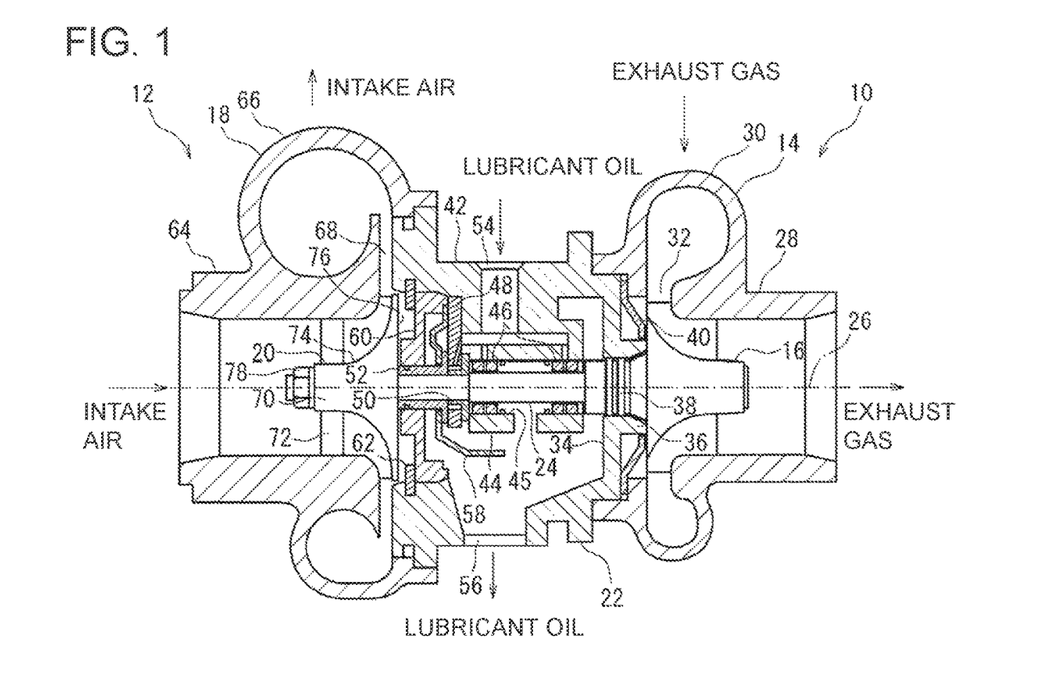
FIG. 1 is a vertical cross-sectional view schematically showing a turbocharger according to some embodiments of the present invention.

FIG. 1 is a vertical cross-sectional view schematically showing a turbocharger according to some embodiments of the present invention. A turbocharger is, for instance, applied to an internal combustion engine of a vehicle, a ship, or the like.

The turbocharger includes a turbine 10 and a compressor 12 of centrifugal type. The turbine 10 includes a turbine housing 14, a turbine blade (turbine impeller) 16 accommodated rotatably in the turbine housing 14, while the compressor 12 includes a compressor housing 18 and an impeller (compressor impeller) 20 accommodated rotatably in the compressor housing 18.

The turbine housing 14 and the compressor housing 18 are fixed to a bearing housing (casing) 22 via a non-depicted fastening member, and the turbine blade 16 of the turbine 10 and the impeller 20 of the compressor 12 are coupled to each other by a drive shaft (turbine rotor) 24 extending inside the bearing housing 22. Thus, the turbine blade 16, the impeller 20, and the drive shaft 24 are disposed on the same axis 26. The turbine blade 16 of the turbine 10 is rotated by exhaust gas discharged from the internal combustion engine, for instance, whereby the impeller 20 of the compressor 12 is rotated via the drive shaft 24. Rotation of the impeller 20 of the compressor 12 compresses intake air to be supplied to the internal combustion engine.

For instance, the turbine housing 14 includes a cylindrical (shroud) section 28 which accommodates the turbine blade 16, and a scroll section 30 surrounding the cylindrical section 28 at a part adjacent to the bearing housing 22. The scroll section 30 has a non-depicted inlet of exhaust gas, and is in communication with the cylindrical section 28 via a throat portion 32. An opening of the cylindrical section 28 on the opposite side from the bearing housing 22 forms an outlet of exhaust gas.

To an opening of the turbine housing 14 on the side of the bearing housing 22, an end wall 34 of the bearing housing 22 is fitted and engaged. A seal portion 36 of a cylindrical shape is integrally and co-axially disposed on the end wall 34, and the seal portion 36 forms a seal hole penetrating through the center of the end wall 34. An end portion of the drive shaft 24 on the side of the turbine blade 16 is disposed inside the seal portion 36, and a seal ring 38 is disposed in a gap between the drive shaft 24 and the seal portion 36.

A back plate 40 of an annular shape is disposed in an annular recess between the end wall 34 and a back surface of the turbine blade 16. An outer rim portion of the back plate 40 is sandwiched by the turbine housing 14 and the bearing housing 22, and an inner rim portion of the back plate 40 surrounds the seal portion 36.

A bearing section 44 is disposed integrally with a peripheral wall 42 inside the bearing housing 22, and a bearing hole 45 is formed on the bearing section 44. Two floating bushes 46, for instance, are disposed inside the bearing hole 45 of the bearing section 44 to function as a radial bearing, and the center part of the drive shaft 24 is disposed inside the bearing hole 45 of the bearing section 44 while being inserted through the floating bushes 46.

A thrust member 48 of a plate shape orthogonal to an axis 26 is fixed to an end surface of the bearing section 44 on the side of the compressor 12, and the drive shaft 24 is inserted through a through hole of the thrust member 48. A thrust collar 50 and a thrust sleeve 52 are fitted onto the drive shaft 24, and the thrust member 48, the thrust collar 50, and the thrust sleeve 52 form a thrust bearing device.

An oil feed port 54 and an oil drain port 56 are disposed on the peripheral wall 42 of the bearing housing 22, and an oil feed passage for feeding lubricant oil to bearing gaps of the radial bearing and the thrust bearing is formed through the bearing section 44 and the thrust member 48. Further, an oil deflector 58 is disposed so as to surround a face of the thrust member 48 on the side of the compressor 12 to prevent lubricant oil from scattering toward the compressor 12.

A lid member 60 with a seal hole in the center is fitted onto an opening of the bearing housing 22 on the side of the compressor 12, and the lid member 60 is fixed to the bearing housing 22 by a fixing ring 62. The thrust sleeve 52 is inserted through the seal hole of the lid member 60, and a non-depicted seal ring is disposed in a gap between the thrust sleeve 52 and the seal hole.

For instance, the compressor housing 18 includes a cylindrical (shroud) section 64 accommodating an impeller 20, and a scroll section 66 surrounding the cylindrical section 64 at a part adjacent to the bearing housing 22. The scroll section 66 has a non-depicted outlet of air supply, and is in communication with the cylindrical section 64 via a diffuser section 68. An opening of the cylindrical section 64 on the opposite side from the bearing housing 22 forms an inlet of intake air.

The impeller 20 includes a hub 70 and a plurality of blades 72. The hub 70 has a shape which is rotationally symmetric with respect to the axis 26. An end side of the hub 70 is disposed on the inlet side of intake air, and the other end side of the hub 70 is disposed on the side of the diffuser section 68, in a direction along the axis 26. An outer peripheral surface 74 of the hub 70 has a trumpet shape that expands toward the other end side, and the hub 70 has a back surface 76 that faces the lid member 60 on the other end side. The plurality of blades 72 is disposed at an interval in the circumferential direction on the outer peripheral surface 74 of the hub 70.

The drive shaft 24 is disposed penetrating the hub 70, and a female screw is formed on a distal end side of the drive shaft 24 disposed on one end side of the hub 70, with a nut as a fastening member 78 screwed onto the female screw. The fastening member 78 contacts the one end side of the hub 70, and applies an axial force to the impeller 20 toward the turbine 10 side in a direction along the axis 26.

Figure 2:
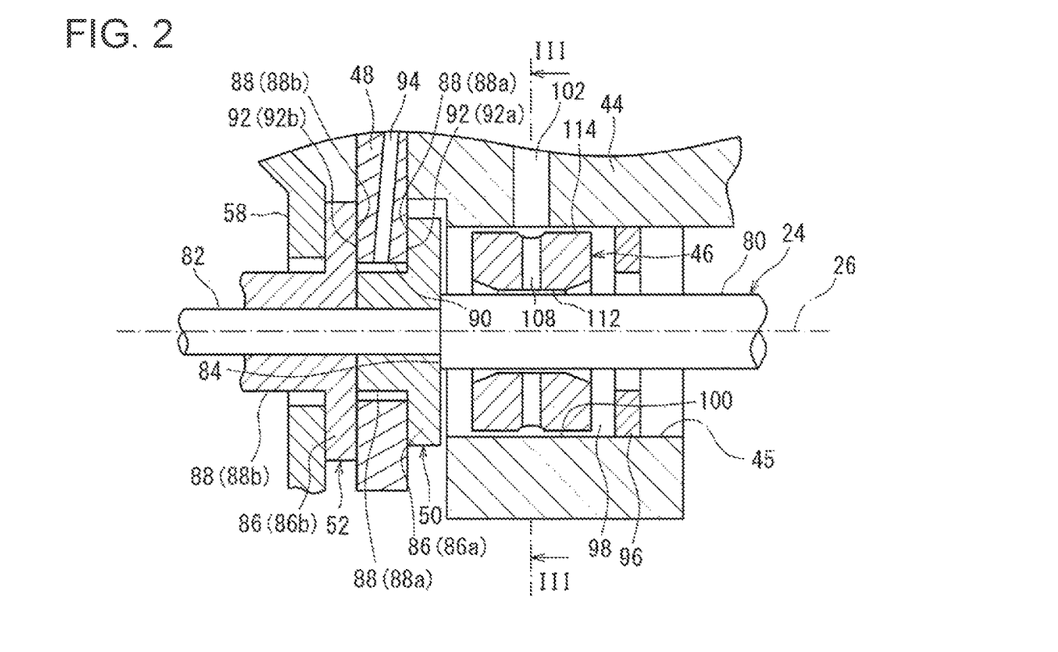
FIG. 2 is a schematic enlarged view of a thrust bearing device and a radial bearing device in FIG. 1.

FIG. 2 is a schematic enlarged view of a thrust bearing device and a radial bearing device in FIG. 1.

The drive shaft 24 includes a large-diameter section 80 disposed inside the bearing hole 45 and a small-diameter section 82 which extends between the bearing hole 45 and the impeller 20. A stepped portion 84 is disposed on a boundary between the large-diameter section 80 and the small-diameter section 82.

At least one flange portion 86 is fitted onto the small-diameter section 82 of the drive shaft 24. In some embodiments, each of the thrust collar 50 and the thrust sleeve 52 fitted onto the small-diameter section 82 in series has a flange portion 86 (86a, 86b).

Further, the thrust collar 50 and the thrust sleeve 52 include sleeve portions 88 (88a, 88b) integrally formed with the flange portions 86 (86a, 86b), respectively, and the sleeve portions 88 (88a, 88b) are fitted onto the small-diameter section 82. The sleeve portion 88a is disposed between the flange portion 86a and the flange portion 86b, and the sleeve portion 88b is disposed between the flange portion 86b and the impeller 20.

The thrust collar 50 and the thrust sleeve 52 are held between the back surface 76 of the impeller 20 and the stepped portion 84 by an axial force of the fastening member 78, and configured to rotate with the drive shaft 24.

The thrust member 48 has a through hole 90 penetrated by the small-diameter section 82, and the sleeve portion 88a is disposed between the inner peripheral surface of the through hole 90 and the outer peripheral surface of the small-diameter section 82. The thrust member 48 has a thrust portion 92 which is disposed around the through hole 90 and which is in slide contact with the flange portions 86a, 86b in a direction along the axis 26, while facing the flange portions 86a, 86b. In some embodiments, the thrust member 48 includes the thrust portion 92 (92a, 92b) on either side in a direction along the axis 26.

Further, the thrust member 48 has an oil-feed hole 94 forming an oil-feed passage, and an outlet of the oil-feed hole 94 is disposed on the inner peripheral surface of the through hole 90. Lubricant oil which flows out through the outlet of the oil-feed hole 94 is supplied to clearance between the thrust portions 92 (92a, 92b) and the flange portions 86 (86a, 86b) through a gap between the outer peripheral surface of the sleeve portion 88a and the inner peripheral surface of the through hole 90.

The floating bush 46 on the side of the compressor 12 is held between the flange portion 86a of the thrust collar 50 and a partition-wall ring 96 having an annular shape. Inside the bearing hole 45, a bearing chamber 98 for the floating bush 46 is defined between the flange portion 86a and the partition-wall ring 96. Inside the bearing hole 45, a bearing chamber for the floating bush 46 on the side of the turbine 10 is also defined.

Figure 3:
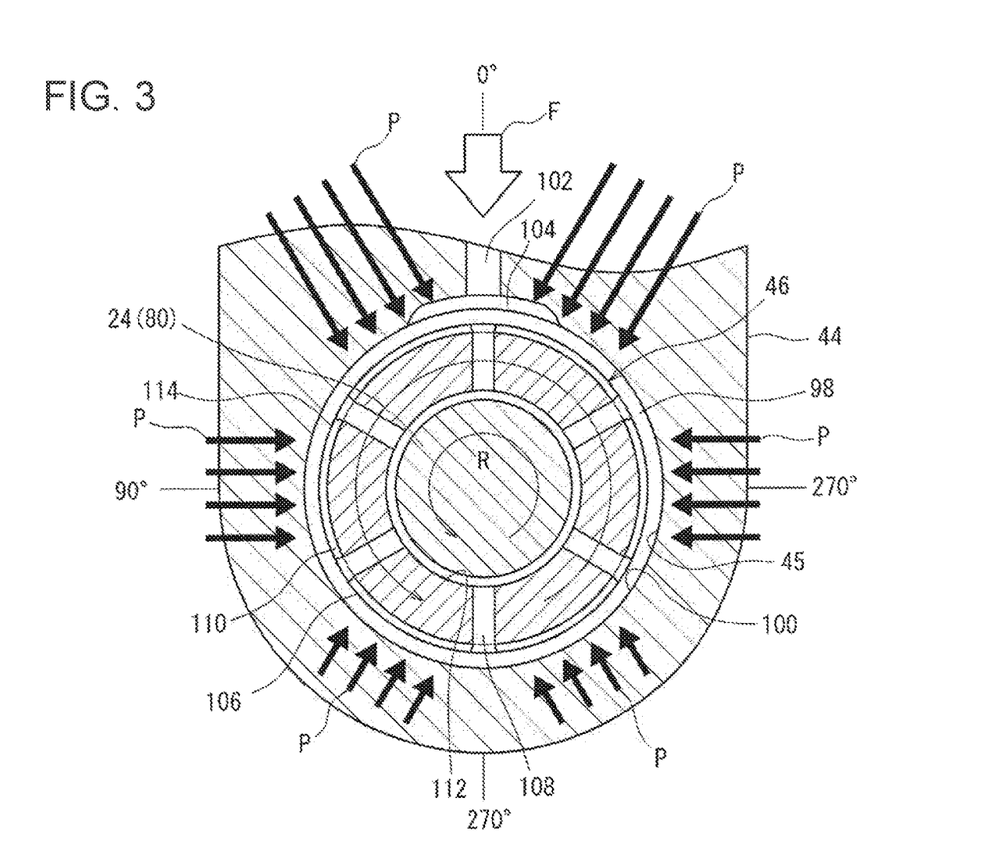
FIG. 3 is a cross-sectional view taken along line in FIG. 2.

FIG. 3 is a cross-sectional view taken along line in FIG. 2.

As depicted in FIG. 3, the floating bush 46 and the large-diameter section (rotary shaft) 80 of the drive shaft 24 are disposed inside the bearing chamber 98, i.e., inside the bearing hole 45, coaxially and rotatably, and the floating bush 46 surrounds the large-diameter section 80. An oil-feed hole 102 forming an oil-feed path is formed on the inner peripheral surface 100 of the bearing hole 45, and lubricant oil is supplied into the bearing chamber 98 through the oil-feed hole 102 along the radial direction of the floating bush 46.

In some embodiments, as depicted in FIG. 3, only one oil-feed hole 102 is disposed to have an opening on the inner peripheral surface 100 of the bearing hole 45 at an upper part of the bearing hole 45, and lubricant oil is supplied downward in the vertical direction.

Further, in some embodiments, as depicted in FIG. 3, a recess portion 104 extending in an arc shape along the inner peripheral surface 100 is formed on the inner peripheral surface 100, and the oil-feed hole 102 has an opening on a bottom surface of the recess portion 104. In other words, the opening of the oil-feed hole 102 is widened in the circumferential direction of the inner peripheral surface 100 thanks to the presence of the recess portion 104.

Figure 4:
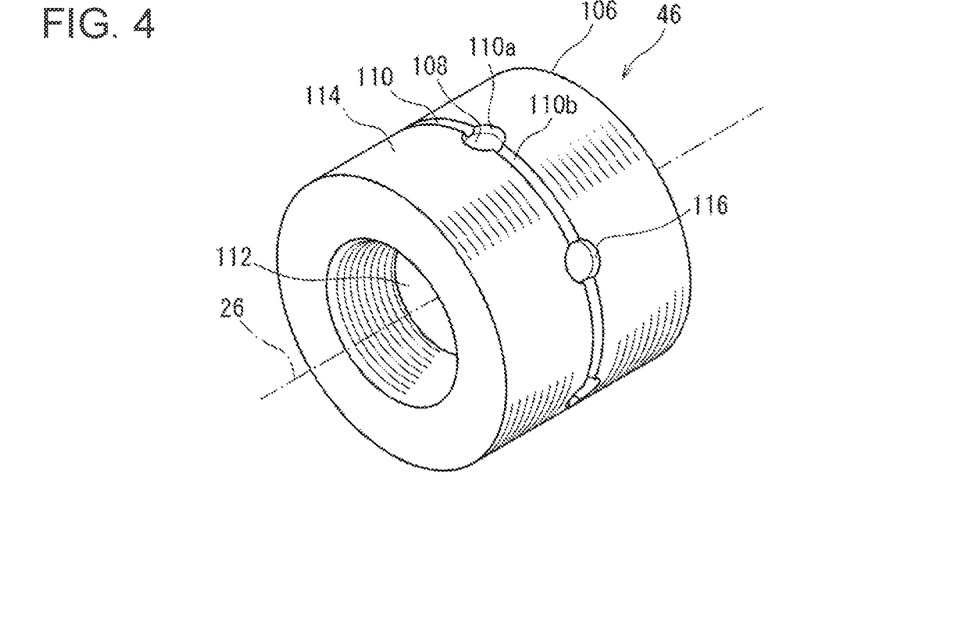
FIG. 4 is a perspective view schematically showing a floating bush in FIG. 3.
Figure 5:
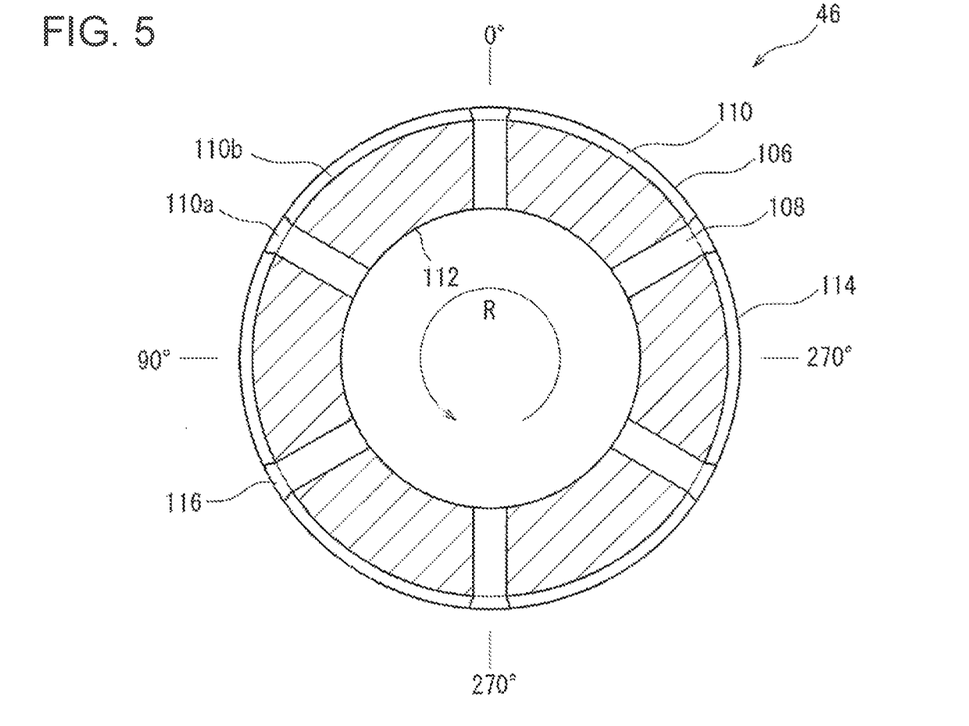
FIG. 5 is a schematic cross-sectional view of the floating bush in FIG. 4.
Figure 6:
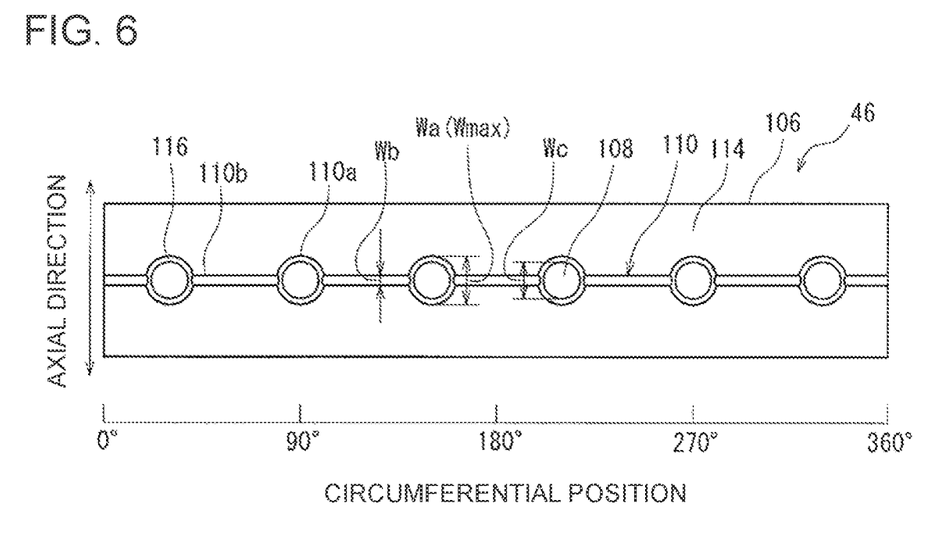
FIG. 6 is a schematic exploded view of an outer peripheral surface of the floating bush in FIG. 4.

FIG. 4 is a perspective view schematically showing the floating bush 46. FIG. 5 is a schematic cross-sectional view of the floating bush 46. FIG. 6 is a schematic exploded view of an outer peripheral surface of the floating bush 46.

The floating bush 46 includes a body portion 106, a plurality of communication holes 108, and a circumferential groove 110.

The body portion 106 has a cylindrical shape, and includes an inner peripheral surface 112 and an outer peripheral surface 114. In some embodiments, the inner peripheral surface 112 and the outer peripheral surface 114 have a true circular shape in cross section. That is, the body portion 106 has a thickness in the radial direction which is constant in the circumferential direction.

The plurality of communication holes 108 each extend between the inner peripheral surface 112 and the outer peripheral surface 114 of the body portion 106, and are disposed at intervals in the circumferential direction of the body portion 106. In some embodiments, the plurality of communication holes 108 extends in the radial direction of the body portion 106, but it is sufficient if the plurality of communication holes 108 is along the radial direction, and the plurality of communication holes 108 may extend oblique to the radial direction.

The circumferential groove 110 extends over the entire circumference in the circumferential direction of the outer peripheral surface 114, and passes through the openings of the plurality of communication holes 108. The circumferential groove 110 has a cross-sectional area that varies in accordance with the circumferential position of the body portion 106. Specifically, the cross-sectional area of the circumferential groove in a direction orthogonal to the circumferential direction of the body portion 106 varies in accordance with the circumferential position on the body portion 106.

With this configuration, the cross-sectional area of the circumferential groove 110 is varied in accordance with the circumferential position, and the cross-sectional area is relatively smaller at one or more location. With the one or more location having a relatively small cross-sectional area, a flow of lubricant oil inside the circumferential groove 110 is mitigated.

The plurality of bold arrows P in FIG. 3 represents schematically a distribution of a static pressure of lubricant oil, illustrating that suppression of a flow of lubricant oil inside the circumferential groove 110 leads to mitigation of a pressure decrease of lubricant oil in the vicinity of the opening of the oil-feed hole 102. As a result, as indicated by a hollow arrow F in FIG. 3, lubricant oil supplied through the oil-feed hole 102 generates a force that presses the floating bush 46 and the drive shaft 24 in one direction against the opposite side from the oil-feed hole 102, which makes it possible to prevent unstable oscillation of the drive shaft 24.

On the other hand, with this configuration, while the cross-sectional area is relatively small in some locations, the cross-sectional area is relatively large in other locations. Lubricant oil is temporarily stored in the locations with a larger cross-sectional area, and the locations function as oil reservoir, and thereby it is possible to supply a sufficient amount of lubricant oil into the floating bush 46 through the communication holes 108 regardless of the presence of the locations with a smaller cross-sectional area.

Accordingly, the above described turbocharger includes a floating bush bearing device with mitigated oscillation, and thus has a good noise-reduction property.

In some embodiments, the recess portion 104 is provided to widen the opening of the oil-feed hole 102, and thereby it is possible to create a static-pressure distribution more effectively.

In some embodiments, as depicted in FIGS. 4 to 6, the circumferential groove 110 includes a plurality of first regions 110a at which the circumferential groove 110 overlaps with the openings of the plurality of communication holes 108 positionally in the circumferential direction of the floating bush 46, and a plurality of second regions 110b each extending between the plurality of first regions 110a. Each of the plurality of first regions 110a has a larger cross-sectional area than each of the plurality of second regions 110b. Specifically, the cross-sectional area of each first region 110a in a cross section orthogonal to the circumferential direction is larger than that of each second region 110b.

With this configuration, the first regions 110a positionally overlapping with the openings of the communication holes 108 have a larger cross section than the second regions 110b extending between the first regions 110a, which makes it possible to store a relatively large amount of lubricant oil in the first regions 110a. Specifically, it is possible to store a sufficient amount of lubricant oil in the vicinity of the communication holes 108. As a result, it is possible to supply a sufficient amount of lubricant oil into the floating bush 46 through the communication holes 108 effectively.

In some embodiments, as depicted in FIG. 6, the width Wa of each of the plurality of first regions 110a in the axial direction of the floating bush 46 is larger than the width Wb of each of the plurality of second regions 110b.

With this configuration, the width of the first regions 110a is larger than the width of the second regions 110b, and thereby it is possible to readily increase the cross-sectional area of the first regions 110a as compared to the second regions 110b.

In some embodiments, as depicted in FIG. 6, the width Wa of each of the plurality of first regions 110a is within a range of from 0.9 to 1.3 times as large as the width We of each of the plurality of communication holes 108, and at least one of the plurality of first regions 110a includes a part at which the width of the circumferential groove 110 reaches the maximum width Wmax in the axial direction of the floating bush 46, while the width Wb of each of the plurality of regions 110b is within a range of from 0.2 to 0.4 times as large as the maximum width Wmax of the circumferential groove 110 in the axial direction of the floating bush 46.

With this configuration, the width Wa of the first regions 110a is in a range of from 0.9 to 1.3 times as large as the width We of each of the communication holes 108, and thereby a sufficient amount of lubricant oil can be stored in the first regions 110a in the vicinity of the communication holes 108. As a result, it is possible to supply a sufficient amount of lubricant oil into the floating bush 46 through the communication holes 108 effectively.

Furthermore, the width Wb of the second regions 110b is from 0.2 to 0.4 times as large as the maximum width Wmax of the circumferential groove 110, and thereby it is possible to securely restrict a flow of lubricant oil in the circumferential direction in the second regions 110b.

In some embodiments, the width Wa of the first regions 110a is approximately 1.1 times the width We of each of the communication holes 108, and the width Wb of the second regions 110b is approximately ⅓ times the maximum width Wmax of the circumferential groove 110.

With this configuration, the width Wa of the first regions 110a is approximately 1.1 times the width We of each of the communication holes 108, and thereby a sufficient amount of lubricant oil can be stored in the first regions 110a. Furthermore, the width Wb of the second regions 110b is approximately ⅓ times the maximum width Wmax of the circumferential groove 110, and thereby it is possible to securely restrict a flow of lubricant oil in the circumferential direction in the second regions 110b.

In some embodiments, as depicted in FIGS. 4 to 6, the plurality of first regions 110a is formed by the respective recess portions 116 formed on the outer peripheral surface 114, and the opening of each of the plurality of recess portions 116 has a circular shape on the outer peripheral surface 114. The opening of each of the plurality of recess portions 116 may have an oval shape or a rectangular shape.

With this configuration, the opening of each of the first regions 110a has a circular, oval, or rectangular shape, and thereby it is possible to form the first regions 110a readily. The plurality of recess portions 116 can be formed by, for instance, shot blasting, laser, or stamping (pressing with a steel ball).

In some embodiments, as depicted in FIGS. 4 to 6, the cross-sectional area of the circumferential groove 110 in a region in the circumferential direction of the floating bush 46 is substantially equal to the cross-sectional area of the circumferential groove 110 in a region 180° opposite from the region.

With this configuration, it is possible to prevent the weight of the floating bush 46 from losing balance due to formation of the circumferential groove 110 with a width that varies in accordance with the circumferential position. As a result, it is possible to prevent generation of synchronous oscillation due to unbalance caused by formation of the circumferential groove 110.

In some embodiments, only the circumferential groove 110 is formed on the outer peripheral surface 114 of the body portion 106, and there is no axial groove formed to extend from the circumferential groove 110 to an end surface in the axial direction of the body portion 106.

Figure 7:
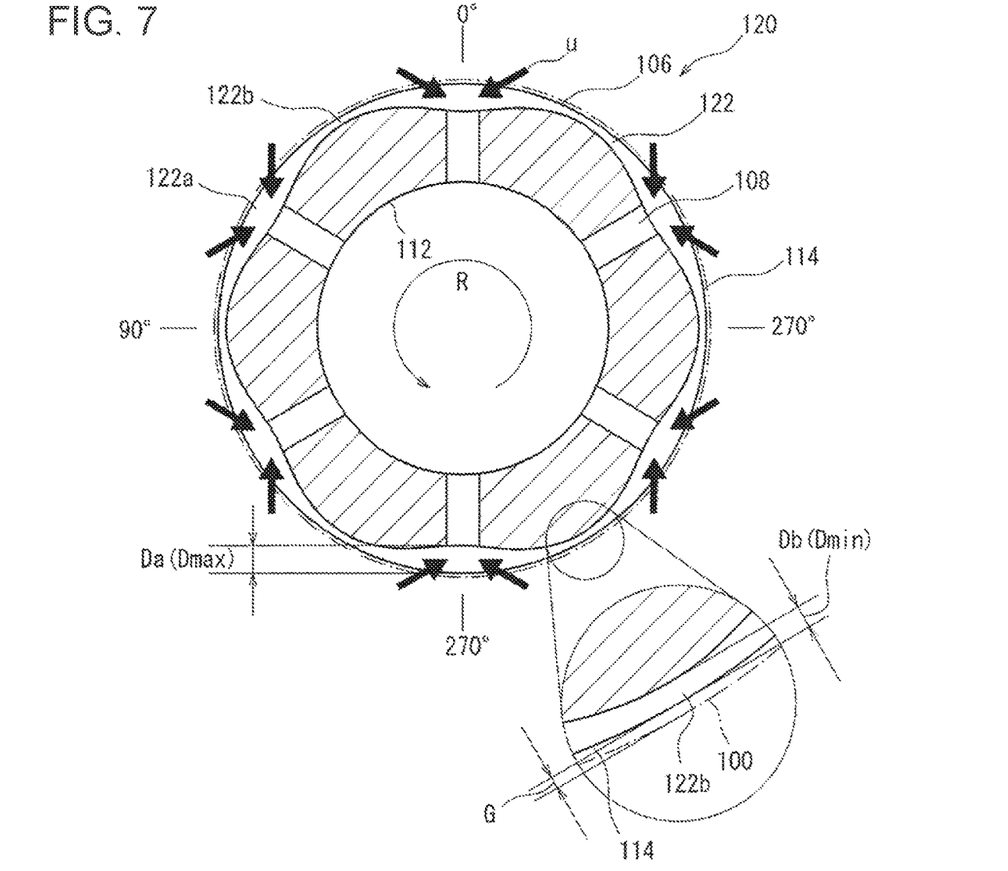
FIG. 7 is a schematic cross-sectional view of a floating bush according to some embodiments.
Figure 8:
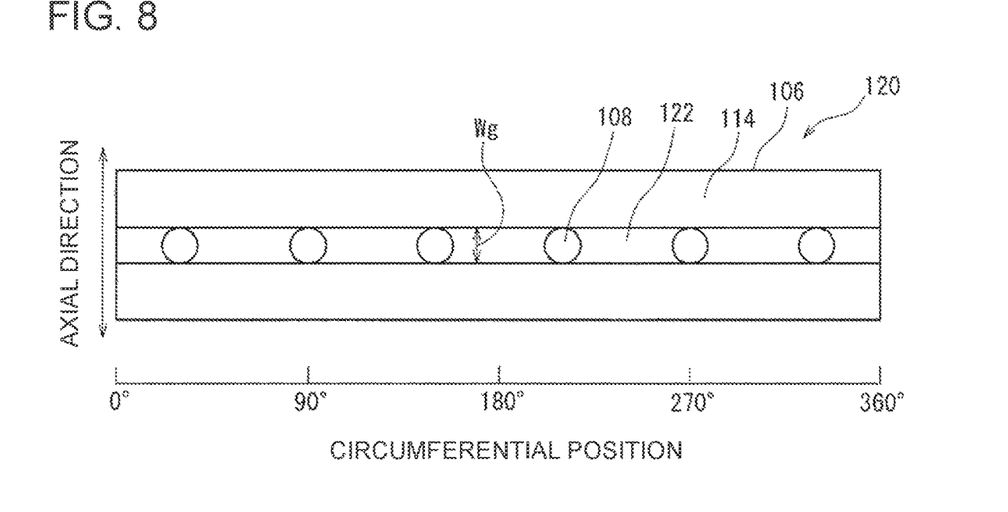
FIG. 8 is a schematic exploded view of an outer peripheral surface of the floating bush in FIG. 7.

FIG. 7 is a schematic cross-sectional view of a floating bush 120 according to some embodiments. FIG. 8 is a schematic exploded view of an outer peripheral surface 114 of the floating bush 120.

In some embodiments, as depicted in FIGS. 7 and 8, a circumferential groove 122 is formed on the outer peripheral surface 114 of the body portion 106 of the floating bush 120, instead of the circumferential groove 110. The circumferential groove 122 extends over the entire circumference of the outer peripheral surface 114 passing through the openings of the plurality of communication holes 108. The circumferential groove 122 of the floating bush 120 has a depth in the radial direction which varies in accordance with the circumferential position.

Specifically, the circumferential groove 122 includes a plurality of first regions 122a at which the circumferential groove 122 overlaps with the openings of the plurality of communication holes 108 positionally in the circumferential direction of the floating bush 122, and a plurality of second regions 122b each extending between the plurality of first regions 122a. The depth Da of each of the plurality of first regions 122a is greater than the depth Db of each of the plurality of second regions 122b.

With this configuration, the depth Da of the first regions 122a is greater than the depth Db of the second regions 122b, and thereby it is possible to readily increase the cross-sectional area of the first regions 122a as compared to the second regions 122b.

Moreover, with this configuration, the depth Da of the first regions 122a is relatively greater than the depth Db of the second regions 122b, and thereby it is possible to induce a flow of lubricant oil flowing toward the communication holes 108 as indicated by the bold arrows u in FIG. 7, and to supply lubricant oil into the floating bush 120 more effectively.

In some embodiments, the width Wg of the circumferential groove 122 in the axis direction of the floating bush 120 is substantially constant, and the maximum depth Dmax of the circumferential groove 122 in the radial direction of the floating bush 120 is not greater than 50 times the radial gap G between the outer peripheral surface 114 of the floating bush 120 and the inner peripheral surface 100 of the bearing hole 45, and the minimum depth Dmin of the circumferential groove 122 in the radial direction of the floating bush 120 is in a range of from two to three times the radial gap G.

With this configuration, the maximum depth Dmax is set to not more than 50 times the radial gap G, and the minimum depth Dmin is set in a range of from two to three times the radial gap G, and thereby it is possible to induce a flow of lubricant oil flowing toward the communication holes 108, and to supply lubricant oil into the floating bush 120 more effectively.

In some embodiments, as depicted in FIG. 7, the circumferential groove 122 of the floating bush 120 has a depth in the radial direction which varies in accordance with the circumferential position of the floating bush 120 continuously or in a wavy pattern. With this configuration, lubricant oil flows into the communication holes 108 smoothly, and it is possible to supply lubricant oil into the floating bush 120 more effectively.

Figure 9:
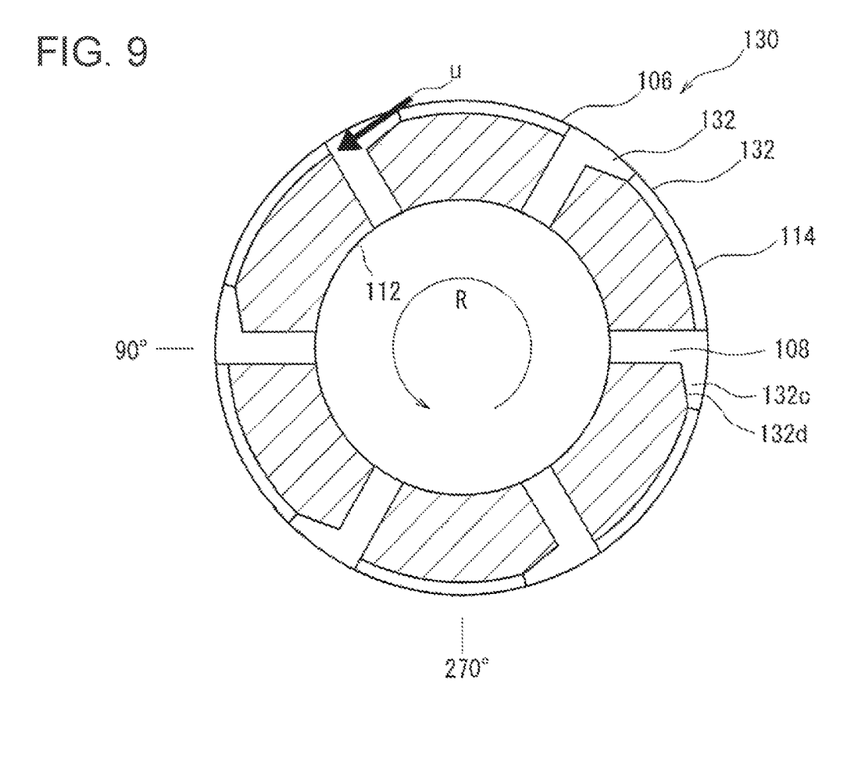
FIG. 9 is a schematic cross-sectional view of a floating bush according to some embodiments.
Figure 10:
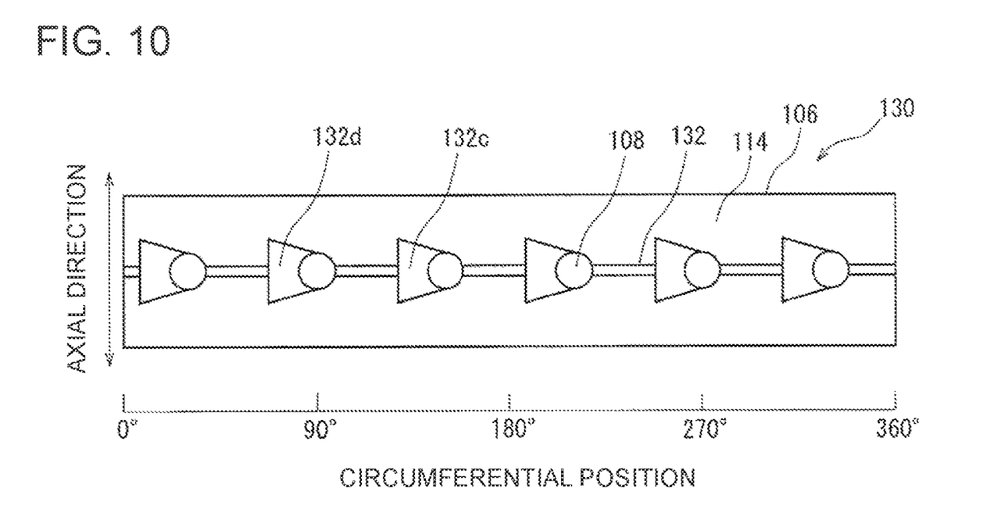
FIG. 10 is a schematic exploded view of an outer peripheral surface of the floating bush in FIG. 9.

FIG. 9 is a schematic cross-sectional view of a floating bush 130 according to some embodiments. FIG. 10 is a schematic exploded view of an outer peripheral surface 114 of the floating bush 130.

In some embodiments, as depicted in FIGS. 9 and 10, a circumferential groove 132 is formed on the outer peripheral surface 114 of the body portion 106 of the floating bush 130, instead of the circumferential groove 110. The circumferential groove 132 extends over the entire circumference of the outer peripheral surface 114 passing through the openings of the plurality of communication holes 108. In the circumferential groove 132, a downstream region 132c joined to a downstream side of the communication hole 108 in the rotational direction R of the floating bush 130 has a cross-sectional area which increases toward the communication hole 108 in the circumferential direction of the floating bush 130.

With this configuration, the cross-sectional area of the downstream region 132c increases toward the communication hole 108, and if lubricant oil is supplied through the oil-feed hole 102 while the floating bush 130 is stopped, the lubricant oil flows into the communication hole 108 from the downstream region 132c as indicated by the bold arrow u in FIG. 9. As lubricant oil is supplied to the communication hole 108 from the downstream region 132c, the lubricant oil applies a rotational force to the floating bush 46. Accordingly, if lubricant oil is supplied at the beginning of rotation of the drive shaft 24, it is possible to assist the start of rotation of the floating bush 46 with a rotational force applied by the lubricant oil.

In some embodiments, as depicted in FIG. 9, the bottom surface of the downstream region 132c joined to the communication hole 108 in the circumferential groove 132 is formed by an inclined surface 132d inclined from the outer peripheral surface 114, and the inclined surface 132d is inclined so that the depth of the circumferential groove 132 increases toward the communication hole 108 in the circumferential direction of the floating bush 46.

With this configuration, the bottom surface of the downstream region 132c joined to the communication hole 108 is formed by the inclined surface 132d, and thereby it is possible to increase the cross-sectional area of the downstream region 132c toward the communication hole 108 readily.

In some embodiments, the width of the downstream region 132c narrows toward the communication hole 108 in the circumferential direction.

Figure 11:
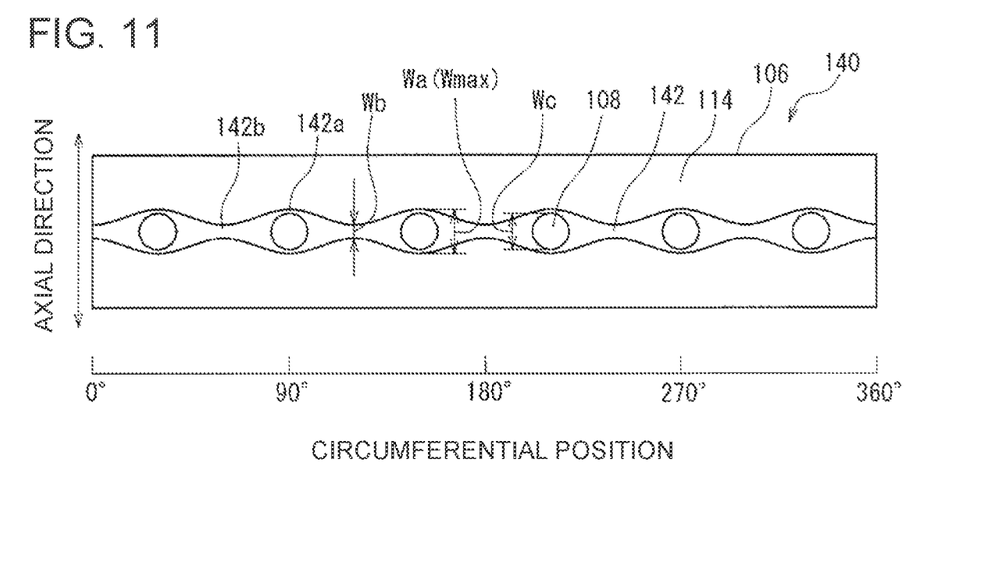
FIG. 11 is a schematic exploded view of an outer peripheral surface of a floating bush according to some embodiments.

FIG. 11 is a schematic exploded view of an outer peripheral surface 114 of a floating bush 140 according to some embodiments. A circumferential groove 142 is formed on the outer peripheral surface 114 of the body portion 106 of the floating bush 140, instead of the circumferential groove 110. The circumferential groove 142 has a width in the axial direction of the floating bush 140 which changes continuously in the circumferential direction, and the width of the first region 142a is greater than the width of the second region 142b.

Figure 12:
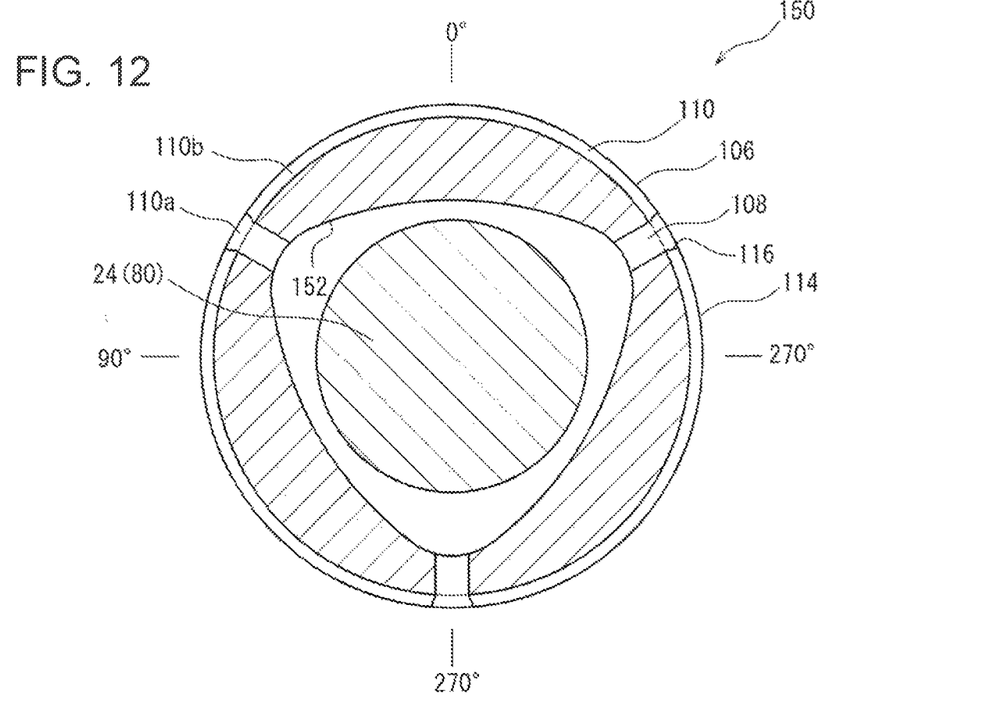
FIG. 12 is a schematic cross-sectional view of a floating bush according to some embodiments, also showing a drive shaft.

FIG. 12 is a schematic cross-sectional view of a floating bush 150 depicted with the drive shaft 24, according to some embodiments.

In some embodiments, as depicted in FIG. 12, an inner peripheral surface 152 of the floating bush 150 has a Reuleaux polygonal shape in a cross section orthogonal to the axis of the floating bush 150.

If the inner peripheral surface 152 of the floating bush 150 has a Reuleaux polygonal shape, it is possible to enhance oscillation stability and to reduce bearing loss as compared to a case in which the inner peripheral surface 152 of the floating bush 150 has a true circular cross section.

On the other hand, if the inner peripheral surface 152 of the floating bush 150 has a Reuleaux polygonal shape, there is a larger gap between the inner peripheral surface 152 of the floating bush 150 and the outer peripheral surface of the drive shaft 24 as compared to a case in which the inner peripheral surface 152 of the floating bush 150 has a true circular cross section. Thus, it is necessary to supply a greater amount of lubricant oil to the gap between the inner peripheral surface 152 of the floating bush 150 and the outer peripheral surface of the drive shaft 24. In this regard, with the circumferential groove 110 with a cross-sectional area varying in accordance with the circumferential position formed on the outer peripheral surface 114 of the floating bush 150, it is possible to supply a sufficient amount of lubricant oil to the gap between the inner peripheral surface 152 of the floating bush 150 and the outer peripheral surface of the drive shaft 24 through the communication holes 108.

A Reuleaux polygon is a kind of a curve of constant width. In some embodiments, the Reuleaux polygon is a Reuleaux triangle formed by three envelope curves. On the inner peripheral surface 112 of the body portion 106, the communication holes 108 have openings in regions where a radial gap between the outer peripheral surface of the large-diameter section 80 and the inner peripheral surface 112 of the body portion 106 reaches its maximum, i.e., regions which correspond to vertices of the Reuleaux polygon. In FIG. 12, three communication holes 108 are disposed on the body portion 106.

Figure 13:
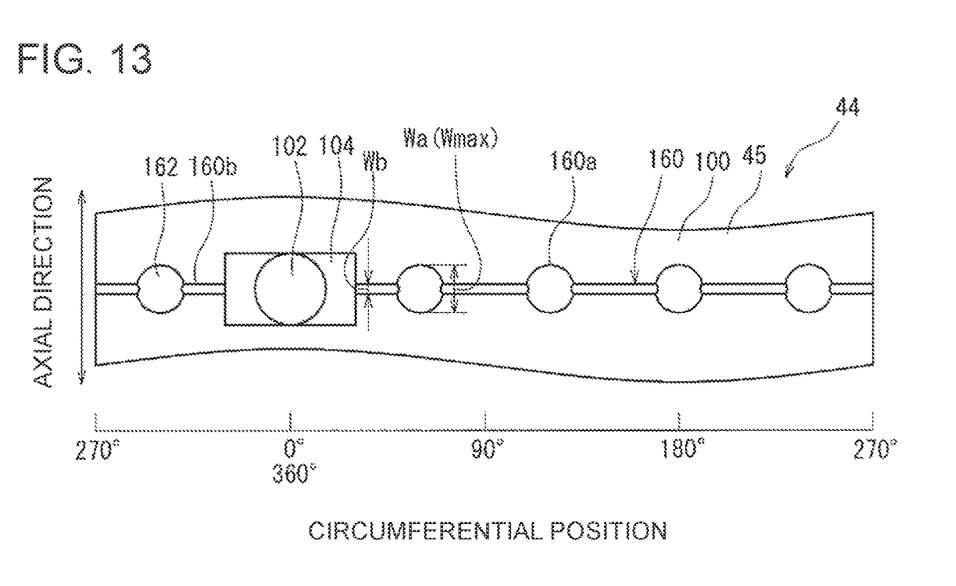
FIG. 13 is a schematic exploded view of an inner peripheral surface of a bearing hole according to some embodiments.

FIG. 13 is a schematic exploded view of the inner peripheral surface 100 of the bearing hole 45 according to some embodiments.

In some embodiments, as depicted in FIG. 13, a circumferential groove 160 is formed over the entire circumference on a position facing the communication hole 108 on the inner peripheral surface 100 of the bearing hole 45, instead of the outer peripheral surface 114 of the floating bush 46. The cross-sectional area of the circumferential groove 160 taken in a direction orthogonal to the circumferential direction of the bearing hole 45 varies in accordance with the circumferential position.

Also with this configuration, similarly to the case of the circumferential groove 110, it is possible to prevent unstable oscillation of the drive shaft 24, and to supply a sufficient amount of lubricant oil into the floating bush.

In some embodiments, the circumferential groove 160 extends passing through the openings of oil-feed holes 102 or through the recess portion 104.

In some embodiments, the circumferential groove 160 includes a plurality of first regions 160a disposed at intervals corresponding to circumferential intervals of the plurality of communication holes, and a plurality of second regions 160b extending between the plurality of first regions 160a.

In some embodiments, the plurality of first regions 160a is formed by respective recess portions 162. The plurality of recess portions 162 have openings of a circular, oval, or rectangular shape.

Embodiments of the present invention were described in detail above, but the present invention is not limited thereto, and various amendments and modifications may be implemented. Possible combinations of embodiments are disclosed by original claims of the present application as filed, or also by combination of original claims of the parent application as filed if the present application has a priority claim.

For instance, while the circumferential groove 160 in FIG. 13 has a shape corresponding to the circumferential groove 110, a circumferential groove of a shape corresponding to the circumferential groove 122 and the circumferential groove 142 may be formed on the inner peripheral surface 100 of the bearing hole 45.

Further, while the cross-sectional area, width, and depth of the circumferential groove vary cyclically in the circumferential direction in the above described embodiments, the change may be random as long as the cross-sectional area is varied in accordance with the circumferential position.

Further, the centrifugal compressor may be of variable displacement type.

DESCRIPTION OF REFERENCE NUMERAL

10 Turbine
12 Compressor
14 Turbine housing
16 Turbine blade
18 Compressor housing
20 Impeller
22 Bearing housing (casing)
24 Drive shaft
26 Axis
28 Cylindrical section
30 Scroll section
32 Throat portion
34 End wall
36 Seal portion
38 Seal ring
40 Back plate
42 Peripheral wall
44 Bearing section
46 Floating bush
48 Thrust member 50 Thrust collar
52 Thrust sleeve
54 Oil feed port
56 Oil drain port
58 Oil deflector
60 Lid member
62 Fixing ring
64 Cylindrical section
66 Scroll section
68 Diffuser section
70 Hub
72 Blade
74 Outer peripheral surface
76 Back surface
78 Fastening member
80 Large-diameter section (rotary shaft)
82 Small-diameter section
84 Stepped portion
86 (86a, 86b) Flange portion
88 (88a, 88b) Sleeve portion
90 Through hole
92 (92a, 92b) Thrust portion
94 Oil-feed hole
96 Partition-wall ring
98 Bearing chamber
100 Inner peripheral surface
102 Oil-feed hole
104 Recess portion
106 Body portion
108 Communication hole
110 Circumferential groove
110a First region
110b Second region
112 Inner peripheral surface
114 Outer peripheral surface
116 Recess portion

The invention claimed is:

1. A floating bush bearing device, comprising:
 a casing including a bearing hole;
 a rotary shaft disposed rotatably inside the bearing hole;
 a floating bush disposed rotatably inside the bearing hole and surrounding the rotary shaft;
 an oil-feed hole of lubricant oil, the oil-feed hole having an opening on an inner peripheral surface of the bearing hole;
 a plurality of communication holes formed on the floating bush, each of the communication holes extending between an inner peripheral surface and an outer peripheral surface of the floating bush, and disposed at intervals in a circumferential direction of the floating bush; and
 a circumferential groove formed on the outer peripheral surface of the floating hush or the inner peripheral surface of the bearing hole and extending over an entire circumference of the outer peripheral surface of the floating bush or the inner peripheral surface of the bearing hole, the circumferential groove passing through openings of the plurality of communication holes or facing the openings of the plurality of communication holes,
 wherein the circumferential groove has a cross-sectional area which varies in accordance with a circumferential position,
 wherein the circumferential groove is formed on the outer peripheral surface of the floating bush,
 wherein the circumferential groove includes a plurality of first regions in which the circumferential groove positionally overlaps with the respective openings of the plurality of communication holes in the circumferential direction of the floating bush, and a plurality of second regions each extending between the plurality of first regions,
 wherein a cross-sectional area of each of the plurality of first regions is greater than a cross-sectional area of each of the plurality of second regions,
 wherein the width of each of the plurality of first regions is in a range of from 0.9 to 1.3 times a width of each of the plurality of communication holes,
 wherein at least one of the plurality of first regions includes a part at which a width of the circumgerential groove reaches a maximum width, and
 wherein the width of each of the plurality of second regions is in a range of from 0.2 to 0.4 times the maximum width of the circumferential groove.

2. The floating bush bearing device according to claim 1,
 wherein the width of the circumferential groove is substantially constant,
 wherein a maximum depth of the circumferential groove is not more than 50 times a radial gap between the outer peripheral surface of the floating bush and the inner peripheral surface of the bearing hole, and
 wherein a minimum depth of the circumferential groove is in a range of from two to three times the radial gap.

3. A turbocharger, comprising:
 the floating bush bearing device according to claim 1;
 a centrifugal compressor including an impeller; and
 a turbine including a turbine blade,
 wherein the turbine blade and the impeller are coupled to each other via the rotary shaft.

4. A floating bush bearing device, comprising:
 a casing including a bearing hole;
 a rotary shaft disposed rotatably inside the bearing hole;
 a floating bush disposed rotatably inside the bearing hole and surrounding the rotary shaft;
 an oil-feed hole of lubricant oil, the oil-feed hole having an opening on an inner peripheral surface of the bearing hole;
 a plurality of communication holes formed on the bush, each of the communication holes extending between an inner peripheral surface and an outer peripheral surface of the floating bush, and disposed at intervals in a circumferential direction of the floating bush; and
 a circumferential groove formed on the outer peripheral surface of the floating bush or the inner peripheral surface of the bearing hole and extending over an entire circumference of the outer peripheral surface of the floating bush or the inner peripheral surface of the bearing hole, the circumferential groove passing through openings of the plurality of communication holes or facing the openings of the plurality of communication holes,
 wherein the communication groove has a cross-sectional area which varies in accordance with a circumferential position,
 wherein the circumferential groove is formed on the inner peripheral surface of the bearing hole,
 wherein the circumferential groove includes a plurality of first regions dispose corresponding to the intervals of the plurality of communication holes in the circumferential direction of the bearing hole, and a plurality of second regions each extending between the plurality of first regions,
 therein a cross-sectional area of each of the plurality of first regions is greater than a cross-sectional area of each of the plurality of second regions, wherein the width of each of the plurality of first regions is in a range of from 0.9 to 1.3 times a width of each of the plurality of communication holes, wherein at least one of the plurality of first regions includes a part at which a width of the circumferential groove reaches a maximum width, and wherein the width of each of the plurality of second regions is in a range of from 0.2 to 0.4 times the maximum width of the circumferential groove.

5. A turbocharger, comprising;
the floating bush bearing device according to claim 4;
a centrifugal compressor including an impeller; and
a turbine including a turbine blade,
wherein the turbine blade and the impeller are coupled to each other via the rotary shaft.

6. A floating bush bearing device, comprising:
a casing including a bearing hole;
a rotary shaft disposed rotatably inside the bearing hole;
a floating bush disposed rotatably inside the bearing hole and surrounding the rotary shaft;
an oil-feed hole of lubricant oil, the oil-feed hole having an opening on an inner peripheral surface of the bearing hole;
a plurality of communication holes formed on the floating bush, each of the communication holes extending between an inner peripheral surface and an outer peripheral surface of the floating bush, and disposed at intervals in a circumferential direction of the floating bush; and
a circumferential groove formed on the outer peripheral surface of the floating bush or the inner peripheral surface of the bearing hole and extending over an entire circumference of the outer peripheral surface of the floating bush or the inner peripheral surface of the bearing hole, the circumferential groove passing through openings of the plurality of communication holes or facing the openings of the plurality of communication holes,
wherein the circumferential groove has a cross-sectional area which varies in accordance with a circumferential position,
wherein a cross-sectional area of a downstream region of the circumferential groove joined to a downstream side of the communication hole in a rotational direction of the floating bush increases toward the communication hole in the circumferential direction of the floating bush.

7. The floating bush bearing device according to claim 6,
wherein the circumferential groove is formed on the outer peripheral surface of the floating bush,
wherein the circumferential groove includes a plurality of first regions in which the circumferential groove positionally overlaps with the respective openings of the plurality of communication holes in the circumferential direction of the floating bush, and a plurality of second regions each extending between the plurality of first regions, and
wherein a cross-sectional area of each of the plurality of first regions is greater than a cross-sectional area of each of the plurality of second regions.

8. The floating bush bearing device according to claim 7,
wherein a width of each of the plurality of first regions is greater than a width of each of the plurality of second regions.

9. The floating bush bearing device according to claim 7,
wherein the plurality of first regions is each formed by corresponding one of a plurality of recess portions, and
wherein an opening of each of the plurality of recess portions has one of a circular shape, an oval shape, or a rectangular shape.

10. The floating bush bearing device according to claim 7,
wherein a cross-sectional area of a part of the circumferential groove is substantially equal to a cross-sectional area of the other part disposed 180° opposite from the part.

11. The floating bush bearing device according to claim 7,
wherein a depth of each of the plurality of first regions is greater than a depth of each of the plurality of second regions.

12. The floating bush bearing device according to claim 6,
wherein the circumferential groove is formed on the inner peripheral surface of the bearing hole,
wherein the circumferential groove includes a plurality of first regions disposed corresponding to the intervals of the plurality of communication holes in the circumferential direction of the bearing hole, and a plurality of second regions each extending between the plurality of first regions, and
wherein a cross-sectional area of each of the plurality of first regions is greater than a cross-sectional area of each of the plurality of second regions.

13. The floating bush bearing device according to claim 6,
wherein a bottom surface of the downstream region joined to the communication hole is formed by an inclined surface inclined from the outer peripheral surface, and
wherein the inclined surface is inclined so that the depth of the circumferential groove increases toward the communication hole in the circumferential direction of the floating bush.

14. The floating bush bearing device according to claim 6,
wherein the inner peripheral surface of the floating bush has a Reuleaux polygonal shape in a cross section orthogonal to an axis of the floating bush.

15. A turbocharger, comprising:
the floating bush bearing device according to claim 10;
a centrifugal compressing including an impeller; and
a turbine including a turbine blade,
wherein the turbine blade and the impeller are coupled to each other via the rotary shaft.

\* \* \* \* \*